United States Patent
Endres

(10) Patent No.: US 7,479,314 B2
(45) Date of Patent: Jan. 20, 2009

(54) HIGH-PRESSURE, FLUID STORAGE TANKS

(75) Inventor: William J. Endres, Houghton, MI (US)

(73) Assignee: Endres Machining Innovations LLC, Houghton, MI (US)

( * ) Notice: Subject to any disclaimer, the term of this patent is extended or adjusted under 35 U.S.C. 154(b) by 234 days.

(21) Appl. No.: 11/459,711

(22) Filed: Jul. 25, 2006

(65) Prior Publication Data
US 2008/0026167 A1    Jan. 31, 2008

(51) Int. Cl.
B29D 22/00    (2006.01)
B29D 23/00    (2006.01)
B32B 1/08     (2006.01)
B65D 39/00    (2006.01)

(52) U.S. Cl. ............... 428/36.5; 428/36.91; 428/36.4; 428/69; 428/71; 428/76; 428/304.4; 428/310.5; 428/320.2; 428/332; 206/0.6; 206/0.7

(58) Field of Classification Search ............... 428/34.1, 428/36.5, 36.9, 36.91, 71, 76, 69, 304.4, 428/310.5, 318.6, 211, 220, 320.2, 332, 36.4; 206/0.6, 0.7
See application file for complete search history.

(56) References Cited

U.S. PATENT DOCUMENTS

2002/0056370 A1 * 5/2002 Masada et al. .................. 96/8
2007/0295617 A1 * 12/2007 Zimmermann .................. 206/7
2008/0017524 A1 * 1/2008 Powell et al. ................ 206/0.6

OTHER PUBLICATIONS

Metal Foam, Wikipedia, hhtp://en.wikipedia.org/wiki/Metal_foam, May 23, 2006, pp. 1-2.
Metal Foams as Novel Compact High Performance Heat Exchangers, LTNT, http://www.ltnt.ethz.ch/researchprojects.php?id_13, Jul. 25, 2006, pp. 1-8.
Foam Metals, Reade Advanced Material, http://www.reade.com/Products/foam/foam-metal.html, May 23, 2006, pp. 1-6.
Granta's Solutions for Metal Foams, GRANTA Material Intelligence, http://www.grantadesign.com/solutions/metalfoams.htm, May 23, 2006, pp. 1-2.

* cited by examiner

Primary Examiner—Michael C Miggins
(74) Attorney, Agent, or Firm—Brooks Kushman P.C.

(57) ABSTRACT

The invention comprehends a tank for storing fluid under pressure and a method for manufacturing the tank. The tank has an inner core of an open-celled foam that is characterized by open voids that are at least partially interconnected by passages and are surrounded by a fibrous or ligament structure/network (collectively, "ligaments"). Attached to the inner core is an outer skin.

16 Claims, 5 Drawing Sheets

HIGH-PRESSURE, FLUID STORAGE TANKS

BACKGROUND OF THE INVENTION

1. Field of the Invention

This invention relates to devices for storing fluids, whether liquid-gaseous or completely gaseous, under high pressure and to methods for making such devices.

2. Background Art

Hydrogen can be stored in a solid state as a chemical hydride or a metal hydride, cryogenically as a liquid or as a liquid-gaseous hybrid with refrigeration and/or insulation accompanied by gradual boil-off, or as a gas under very high pressure.

Other gases, such as but not limited to, oxygen, nitrogen, and carbon dioxide, can be stored in similar manner to hydrogen, i.e., as a cryogenic liquid, possibly as a cryogenic liquid-gas combination, or as a pressurized gas. Hydrogen and oxygen illustrate the need for and challenges of portable gas storage.

A major application of portable hydrogen storage is for use in hydrogen-based vehicles, where enough hydrogen is needed for an acceptable driving range. That range must be achieved with a storage tank that neither consumes inordinate space, nor adds excessive empty-tank weight to the vehicle.

A common application of portable oxygen storage is for home/personal oxygen therapy in the medical field. Storage of oxygen sufficient for a day away from a non-portable system requires a tank that is often unmanageable without the use of a wheeled cart, or sometimes via a carried shoulder sling. While conservor systems, which impede oxygen flow during exhalation, make these systems more efficient, 10 hours of oxygen at a low prescription of 2 lpm requires a 'D' tank. Such tanks are typically 100 mm in diameter, 400 mm tall, and when empty weigh over 5 lbs. Ambulatory (active) patients may consume oxygen at 2-3 times that rate.

Another application of portable oxygen storage tanks is in fire and rescue self-contained breathing apparatus (SCBA's). Similar to that is storage of compressed air for diving (SCUBA) applications. In SCBA applications, one wishes to minimize weight. In SCUBA applications, weight is not as much an issue, as neutral buoyancy is attractive.

All these applications utilize tanks having a shape that is commonly cylindrical. Such a shape provides the most efficient containment of pressure and volume for a given strength of material that makes up the outer shell of the hollow container.

Recent advancements have led to reducing the mass of tanks for SCBA, in the form of carbon-fiber tanks. For healthcare applications, aluminum tanks are now used. The most recent advancements in high-pressure portable storage have been motivated by the need for vehicular hydrogen storage.

One commercial embodiment of high-pressure hydrogen storage is Quantum's 10 ksi (23.5 ksi burst pressure) tank that extends a previous 5 ksi tank (Quantum Fuel Systems Technologies Worldwide, Inc., Irvine, Calif.). These tanks are believed to utilize an inner liner made of a high molecular weight polymer that serves as a hydrogen gas permeation barrier. The barrier is then surrounded by a carbon fiber-epoxy resin composite shell that is the pressure load-bearing component of the tank. Preferably, such systems should be resistant to hydrogen corrosion and deploy materials that are not affected by stress corrosion cracking and hydrogen embrittlement.

As noted, hydrogen can also be stored in a solid state through absorption and recovery of hydrogen from the surface of the substrate where for example, a chemical hydride forms. These storage approaches suffer from high tank mass, and aim to improve storage efficiency by maximizing the surface area to weight ratio of the material in which the storage occurs. For example, foams with very small cell/void sizes, even aerogels ("solid smoke"), provide good surface area to weight ratios, but are still heavy in relation to the mass of hydrogen that can be absorbed.

SUMMARY OF THE INVENTION

In contrast to other approaches, the invention uses a structural foam to contain the pressurized gas (hydrogen in one case) by withstanding the pressure/mechanical load. The structural foam is loaded internally, not externally.

Thus, the invention comprehends a tank for storing fluid under pressure. The tank has an inner core of an open-celled foam that is characterized by open voids. Such voids are at least partially interconnected by passages and are surrounded by a fibrous or ligament structure/network (collectively, "ligaments"). Attached to the inner core is an outer skin.

DETAILED DESCRIPTION OF THE PREFERRED EMBODIMENT(S)

The invention includes a tank for storing a fluid, such as a gas, under pressure. The tank has an inner core of an open-celled foam that is characterized by voids that are at least partially interconnected by passages and are surrounded by a fibrous or ligament structure/network (collectively, "ligaments"). Attached to the inner core is an outer skin.

Figure 1:
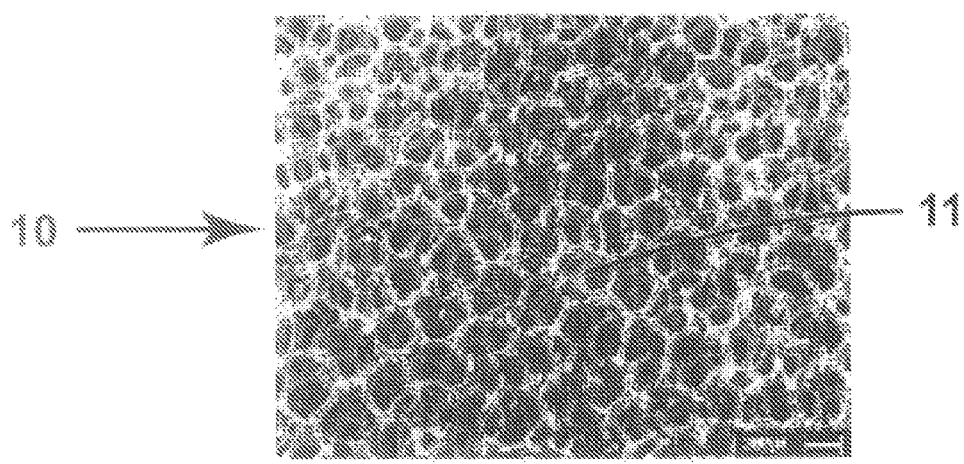
FIG. 1 includes cross-sectional views of a prior art open-celled metallic foam at different magnifications.
Figure 1:
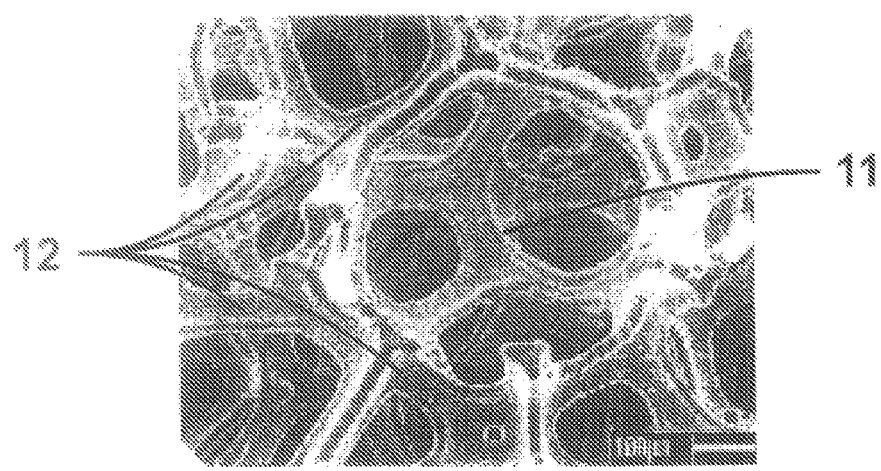
Figure 2:
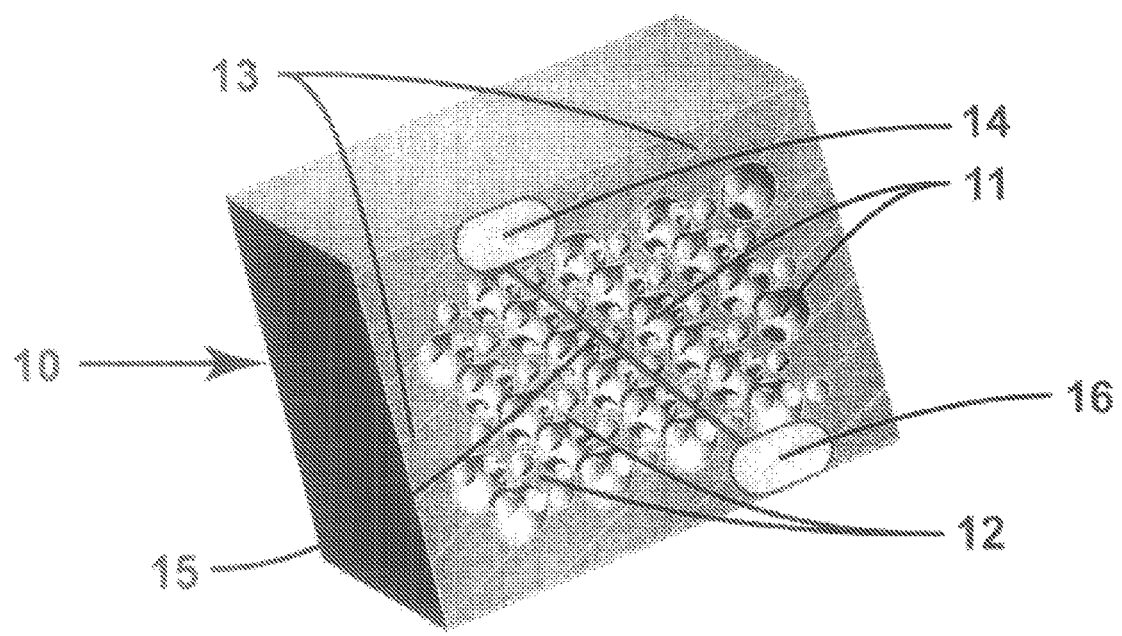
FIG. 2 is a cross-sectional view of a close-packed idealized CAD model of open-celled foam.
Figure 3:
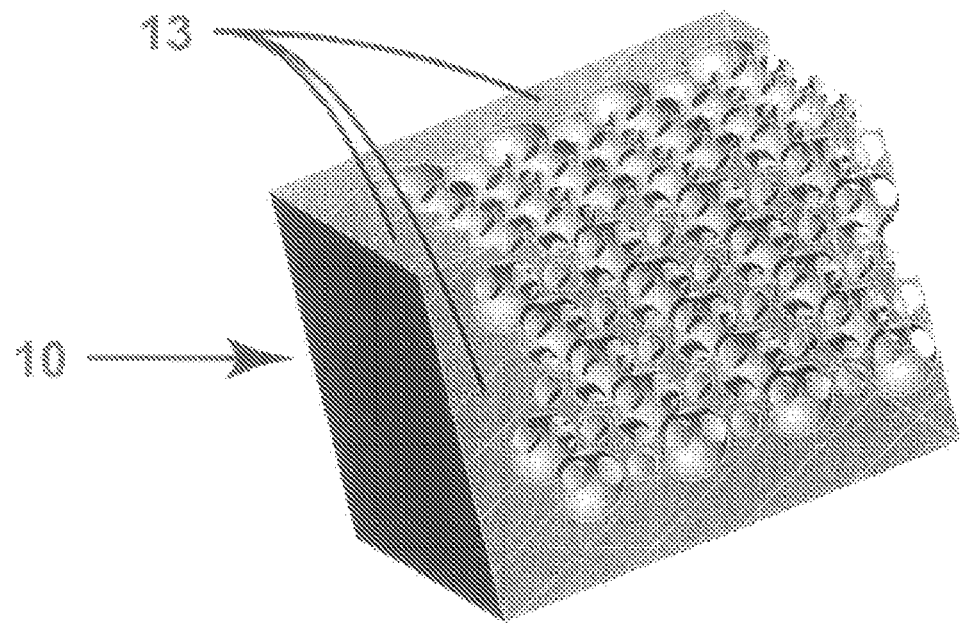
FIG. 3 is a multi-sectional view of a close-packed idealized CAD model of open-celled foam showing at the upper right the ligament nature of the material between the voids.
Figure 4:
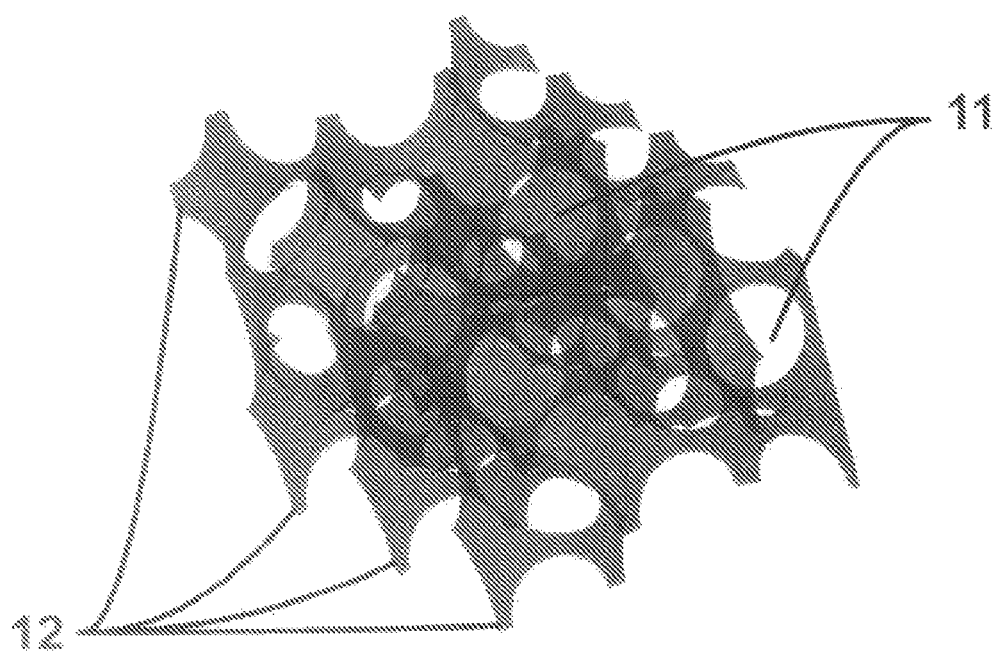
FIG. 4 is a unit cell of the close-packed idealized CAD model of open-celled foam where the material is transparent—passageways through the foam are visible.

FIG. 1 depicts a known open-celled metallic foam 10 made up of voids 11 and surrounding material 12 that appear as a network of ligaments. As shown in FIGS. 2-4, the pressurized gas is stored inside an open-celled structural foam 10 that has an outer skin 13, thus loading the foam internally. Pressure acts outwardly on the cells and ultimately on the outer skin 13. As shown in FIG. 2, the cellular ligament structure 12 holds patches or regions (for example 14) of the outer skin in balance through a load path (for example 15), with distally located patches/regions of outer skin (for example 16).

The outer skin 13 can be of the same material as the core and thus can be created at the same time as the interior open-celled foam region. Or, the outer skin can be of different material from the core and be added to an open-celled foam structure.

Figure 5:
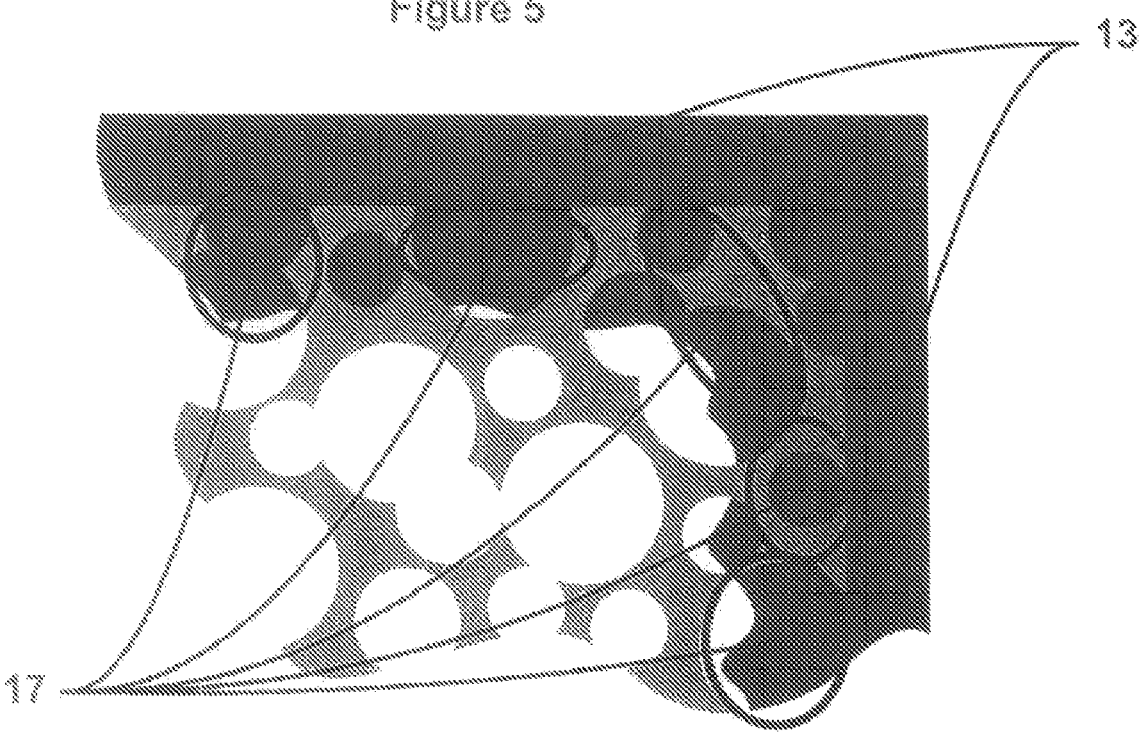
FIG. 5 is a sectional 2-D illustration of an added layer of a material, different from the foam that mechanically interlaces with the outer layer of cells to integrate the outer skin.

If the materials are the same, localized welding (a "weldment") occurs between the molten skin material (upon dipping or plasma spraying, for instance) and the cells in the outer layer(s) cell of the foam. As depicted in FIG. 5, in the case of a different material (e.g., an epoxy dipped, sprayed or spread on the surface), the outer skin 13 integrates with the foam through not only adhesion but also via mechanical interlacing 17 with the outer layers of cell structures.

The open-celled nature of the invention allows a fluid, such as the gas to be stored under pressure to diffuse throughout the inner space. However, since the cells can be small in size, 25 micrometers for instance, there is some point at which the gas flow through the open-celled structure is regulated due to the resulting flow restriction. Flow may be restricted by the small passageways from cell to cell. This increases the drag for a given flow velocity, noting that flow drag increases also with the square of flow velocity. As such, the entire tank can be self-regulating to some degree.

Figure 6:
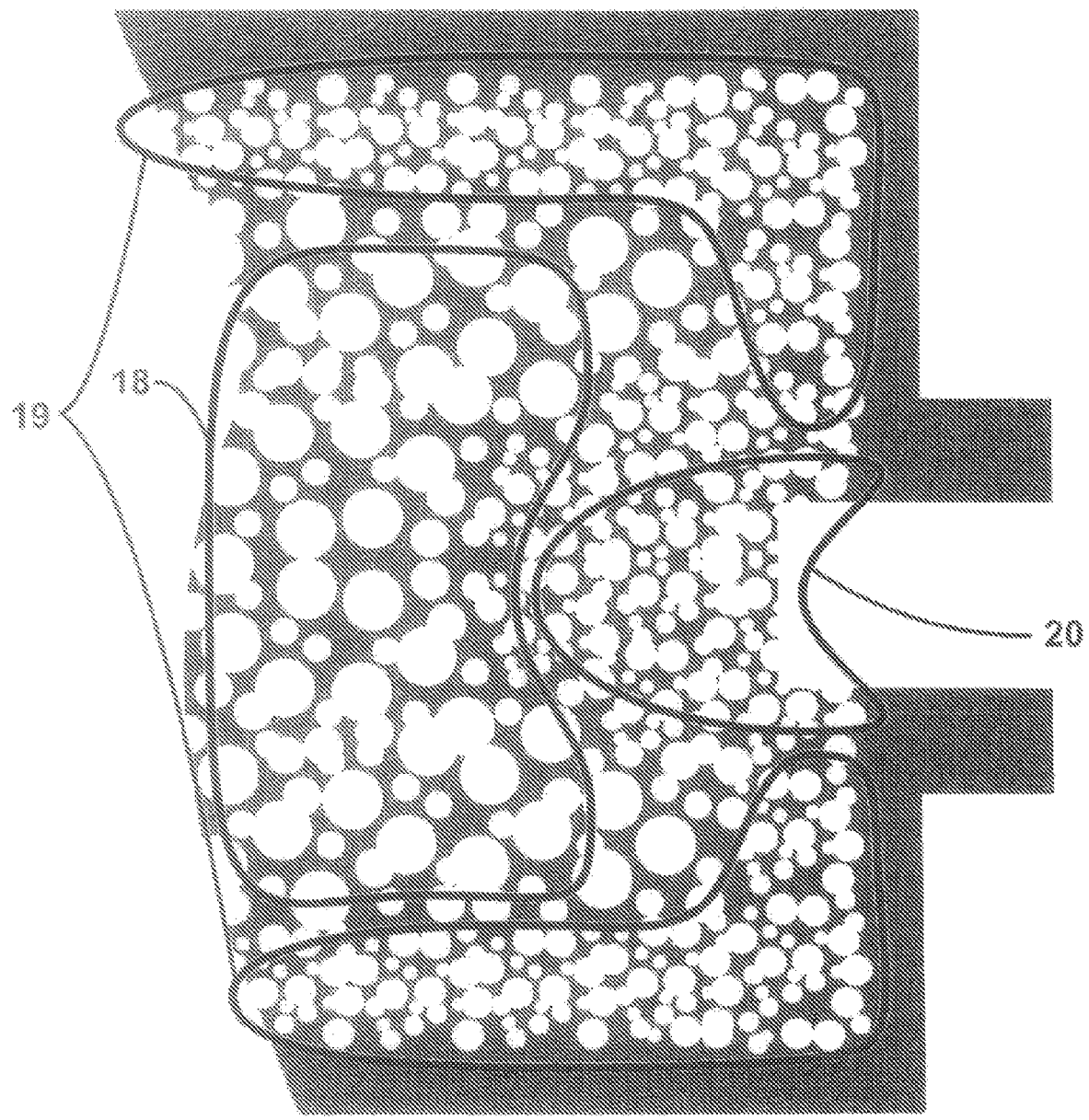
FIG. 6 is a fragmented, sectional 2-D illustration of decreased void size near the outer skin and in the region of an exhaust valve attachment to the tank.

Alternatively, (FIG. 6), the cell size can be larger in the interior 18. In this embodiment, smaller cells lie along the exterior 19 and near an exhaust valve attachment 20, the latter serving as a final regulator for useful-flow characteristics. The former serves to regulate flow should the outer skin be compromised, such as in an accident.

Figure 7:
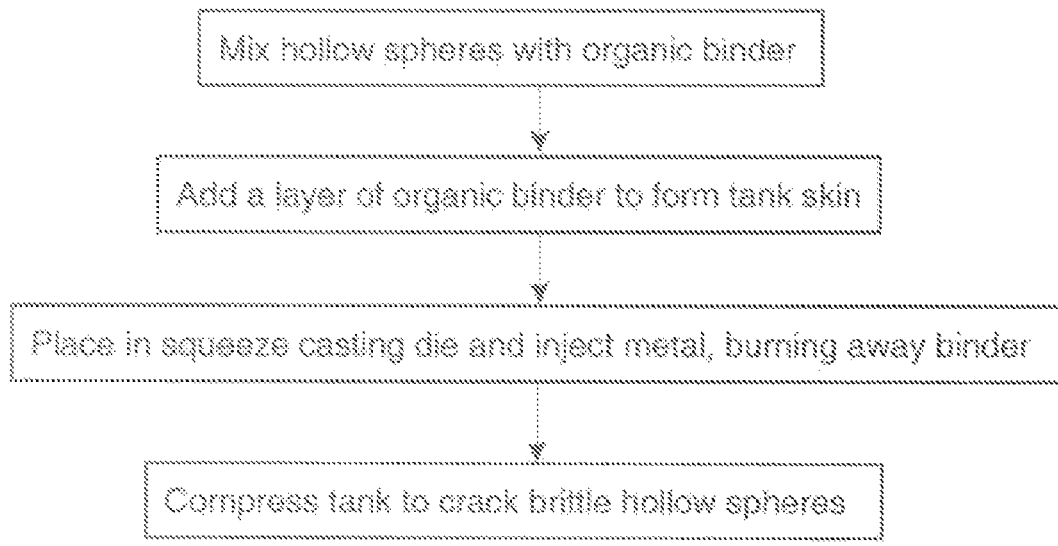
FIG. 7 is a process flow diagram illustrating the steps in making a syntactic-foam version of the disclosed invention.
Figure 8:
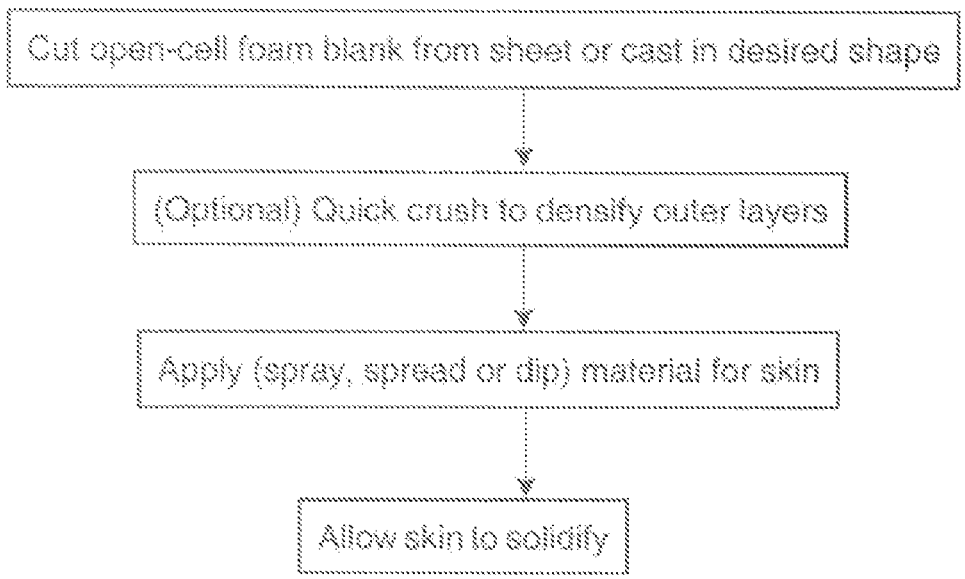
FIG. 8 is a process flow diagram illustrating the steps in making a gas-bubbled and coated version of the disclosed invention.

FIGS. 7-8 show the main steps in making two embodiments that are conducive to different applications. The syntactic foam version of FIG. 7 is useful when significant, overall flow regulation is desired. As used herein, the term "syntactic foam" means a lightweight foam that includes glass hollow spheres that are embedded in a matrix. Such spheres typically may range from 10 to 200 microns in diameter. The spheres may be made of glass, ceramic, polymers, and mixtures thereof. Flow constriction is desirable when a tank is penetrated during an accident.

In one embodiment, the gas-bubbled foam with applied outer skin (FIG. 8) is useful when high regulation is not needed and/or there is a demand for no contamination that may otherwise result from broken micro-sphere pieces. The inventive process includes an optional surface densification crushing step that can be employed to decrease void density at the outer layers as a means to increase regulation in the event of a surface-level breach.

In some embodiments, the void density of the core structural foam exceeds 75%. Correspondingly, the foam mass density of the bulk material is less than about 25%. In some cases, the void density may decrease closer to the outer skin of the tank.

If desired, the structural foam core is made by passing gas bubbles through or creating gas bubbles in a molten polymer or metal. Alternatively, the structural foam is made by dissolving gas from a molten polymer or metal by changing ambient pressure and/or temperature during solidification.

Where the core is made of structural foam that is of a syntactic type, the foam is made by injecting a molten polymer or metal to fill spaces between hollow spheres. In such cases, the outer skin may be attached to the structural foam core by a weldment during solidification of the foam core. Optionally, hollow spheres can be broken to allow fluid to access their inner space.

As noted earlier, the structural foam core can be made from a material that is selected from the group consisting of polymers, metals, metal alloys, and ceramics.

Thus, the present invention makes use of open-celled foam to provide increased pressure capacity for a given tank mass or external tank volume. The invention employs an impermeable outer skin having a shape that may be symmetrical or asymmetrical (i.e., shape is not necessarily cylindrical or spherical as are typical pressure vessels/tanks). The pressurized fluid is stored under pressure inside the voids of the foam structure. The outer skin is supported in many places by the ligament structure of the foam.

An internal pressure creates tensile loading of the ligament network that is relatively equal in all directions, if there are substantial uniformities of cell size. This yields greater overall pressure-to-mass capability than, for example, a cylindrical (shell-only) or spherical tank. The tank shape is constrained only by the combination of cells, i.e., it can be any shape with geometric features larger than the cell size.

Since the ligament structure impedes fluid flow, as it does when metallic foams are used for constriction, the invention can provide some degree of self-regulation for controlled delivery of the fluid. For example, it is anticipated that upon compromising the outer skin, less violent exhaust occurs of the pressurized fluid to the environment, and explosive forces are substantially reduced.

An increased pressure capability results for a given type of tank material (e.g., aluminum foam versus an aluminum and/or carbon-fiber-wound cylindrical tank), since the ligament network within the structural foam acts as miniature cables that hold all the outer surfaces to each other.

It may be possible to create an "interior cabling" structure, such as a matrix of fibers (like ceramic fibers) with an outer shell. However, geometrical assessment of the volume that individual fibers would consume indicates it would be excessive since the fibers must run in all (three, for instance) directions, and where they cross, they must overlap rather than intersect. In contrast, the ligament structure of the open-celled structural foam is like many intersecting fibers, not overlapping fibers. Hence, it can provide better strength per material/fiber volume. Furthermore, using structural foam provides a natural way of creating the fibrous matrix structure.

Arbitrary shape of the pressure vessel is possible since the pressure acting on a small element of the outer skin, the area corresponding to a single void in the structural foam, is carried as a tensile stress in the ligaments surrounding that void. That load is then transferred to other ligaments, and eventually balanced by the pressure acting on the outer skin on an opposite side of the tank. Since the ligament network has a spatial resolution that is very small, it can accommodate any shape that is made up of "cells" of that size. This has a similar effect to the pixel size on a computer screen and its relation to the shapes one can draw in a specified envelope. In fact, it is similar to the idealized case of many nested (in a close-packed structure) spheres with solid ligaments filling in around them, each sphere acting like a microscopic spherical pressure tank that is linked to and overlaps with its adjacent spherical tanks.

Traditional spherical or cylindrical tanks, on the other hand, even if made smaller and nested together, would have to become micro-sized to achieve the similar effect. Of course, they would not be integrated or "glued" together as in this structural foam approach. This would mean that their effective ligaments (micro-cylinder walls) would be doubled and less weight-effective.

There are various ways of manufacturing the tanks of the present invention. They can be manufactured, for example, from polymers, ceramics, and metal alloys. The material to use depends on the particular application and its relative prioritization of tank mass versus total external volume.

Structural foams, both polymeric and metallic, can be made to void densities greater than 90%. As void density increases, there is more internal volume (relative to a given external tank volume) for gas to consume, though maximum gas pressure would decrease. Thus, a larger external volume may be needed to hold the same mass of gas. Since the density of gas increases disproportionately (at a slower rate) as the pressure increases, increased void density at lower gas pressure can contain a greater mass of hydrogen per mass of the tank, though possibly at some sacrifice of total external volume. There is a variety of optimum void densities depending on the relative importance placed on mass of the tank versus total external volume of the tank.

One way in which polymer foams can be made is by gas bubbles forming during solidification. Bubbles form due to change in pressure and temperature. The gas that is in solution in the molten polymer may come out of solution, in the same way carbonation comes out of solution from a carbonated beverage when the pressure changes upon opening the container. When the bubbles form, a void is created. Depending on the concentration of gas in solution and other factors, the void density can be controlled. The quick cooling of the outer layer at the die surface can freeze the outer layer without bubble formation, potentially yielding the desired outer skin. This may also be extendible to metallic foam manufacture.

However, since the spheres (e.g., hollow glass spheres or cenospheres, byproducts of fly ash formed in coal-fired power generation) are brittle, slight deformation in multiple directions causes the spheres to fracture. This creates pathways between them along which the small gas molecules may travel. By encapsulating the matrix of spheres with a layer of material (e.g., a binder) that will burn away when the molten metal hits it, an outer skin would be formed around the cellular interior. This approach could enhance the self regulating nature, though it could be over regulated when the pressure becomes lower as the tank becomes partially emptied.

One material of choice is often high strength aluminum. However, if weight is not a concern, e.g. for SCUBA applications, steel can be used. Titanium may also be a suitable material, depending on the application. However, its cost is high compared to aluminum, so it is likely to be effective only for special applications, perhaps for hydrogen (and even oxygen) needs on the battle field.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tank which contains fluid under pressure, the tank comprising:
    an inner core of an open-celled structural foam characterized by voids that are at least partially interconnected by passages and surrounded by fibrous material; and
    an outer skin that is attached to the inner core.

2. The tank of claim 1, wherein the structural foam has a void density greater than 75%.

3. The tank of claim 1, wherein the structural foam core is of a material selected from the group consisting of a polymer, a metal, and a ceramic.

4. The tank of claim 1, in which the inner core is characterized by a void density that decreases proximate the outer skin.

5. The tank of claim 1, wherein the structural foam core is made by passing gas bubbles through a molten polymer or metal.

6. The tank of claim 1, wherein the structural foam core is made by creating and passing gas bubbles through a molten polymer or metal.

7. The tank of claim 1, wherein the structural foam core is made by dissolution of dissolved gas from the molten polymer or metal upon a change in pressure and temperature during solidification.

8. The tank of claim 1, wherein the outer skin is made of the same material as the structural foam core.

9. The tank of claim 8, wherein the outer skin is attached to the structural foam core by a weldment.

10. The tank of claim 1, wherein the outer skin is made of a different material from the structural foam core.

11. The tank of claim 10, wherein the outer skin is attached to the structural foam core by adherence.

12. The tank of claim 11, wherein the outer skin is attached to the structural foam core by a mechanical interlacing with one or more of the group consisting of cells, voids, and ligaments of the outer layers of structural foam.

13. The tank of claim 1, wherein the structural foam core is of the syntactic type and is made by injecting melt to fill at least some spaces between at least some hollow spheres.

14. The tank of claim 13, wherein the outer skin is attached to the structural foam core by a weldment during solidification of the foam core.

15. The tank of claim 13, wherein the hollow spheres are broken to allow fluid to access their inner space.

16. The tank of claim 13, wherein the melt is selected from the group consisting of a polymer, a metal, and combinations thereof.

* * * * *